United States Patent
Park et al.

(10) Patent No.: US 9,212,738 B2
(45) Date of Patent: Dec. 15, 2015

(54) STRUCTURE FOR PREVENTING GEAR SHIFT LEVER FROM MOVING WHEN REAR-END COLLISION OCCURS

(71) Applicant: Hyundai Motor Company, Seoul (KR)

(72) Inventors: Young-Je Park, Suwon-si (KR); Chang-Hyun Lee, Seoul (KR); Yang-Rae Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 14/106,756

(22) Filed: Dec. 14, 2013

(65) Prior Publication Data

US 2014/0352475 A1 Dec. 4, 2014

(30) Foreign Application Priority Data

May 28, 2013 (KR) .................. 10-2013-0060073

(51) Int. Cl.
*F16H 61/18* (2006.01)
*F16H 59/02* (2006.01)

(52) U.S. Cl.
CPC ............ *F16H 59/0278* (2013.01); *F16H 61/18* (2013.01); *Y10T 74/20085* (2015.01)

(58) Field of Classification Search
CPC .............. F16H 2059/048; F16H 2061/223; F16H 2061/226; F16H 2059/0291; F16H 2059/0282; F16H 61/16; F16H 61/18; F16H 61/22; F16H 2061/185
USPC .............. 74/473.21, 473.27, 473.22, 473.26, 74/473.28, 527, 529, 532; 180/282, 285
See application file for complete search history.

(56) References Cited

U.S. PATENT DOCUMENTS

| | | | | |
|---|---|---|---|---|
| 2,491,657 A * | 12/1949 | Graves, Jr. | ..................... | 335/175 |
| 2,506,187 A * | 5/1950 | Yarrick | ........................... | 335/46 |
| 2,573,199 A * | 10/1951 | Holman | ..................... | 200/61.53 |
| 2,839,947 A * | 6/1958 | Chamberlin et al. | ........... | 74/527 |
| 4,381,682 A * | 5/1983 | Kudo et al. | ................ | 74/473.22 |
| 4,955,935 A * | 9/1990 | Katayama | ................. | 74/473.21 |
| 5,094,115 A * | 3/1992 | Michihira et al. | ............. | 74/335 |
| 2002/0152828 A1 * | 10/2002 | Nagasaka et al. | ............ | 74/473.3 |
| 2010/0096897 A1 * | 4/2010 | Kienke et al. | ............. | 297/367 R |

FOREIGN PATENT DOCUMENTS

| | | | |
|---|---|---|---|
| JP | 2005-145435 A | 6/2005 | |
| JP | 2008-105584 A | 5/2008 | |
| KR | 2003-0026452 A | 4/2003 | |

* cited by examiner

*Primary Examiner* — William Kelleher
*Assistant Examiner* — Gregory Prather
(74) *Attorney, Agent, or Firm* — Morgan, Lewis & Bockius LLP

(57) ABSTRACT

A structure prevents a gear shift lever from moving during a rear-end collision, and may include: a case mounted on the gear shift lever having a sliding groove; a lever having one end coupled to the case rotatable below the groove; a ball seated on the lever; a spring coupled to the lever so that elastic force is applied to raise the lever; a protruding portion mounted separate from the gear shift lever and positioned below another end of the lever, in which when the lever is rotated downward, an end of the lever is locked by the protruding portion blocking movement of the gear shift lever. When a rear-end collision occurs, the ball slides due to inertia rotating the lever downward to physically block the lever, thereby preventing a secondary accident by preventing the gear shift lever placed at an R-stage from unintentionally moving.

7 Claims, 3 Drawing Sheets

FIG. 3A
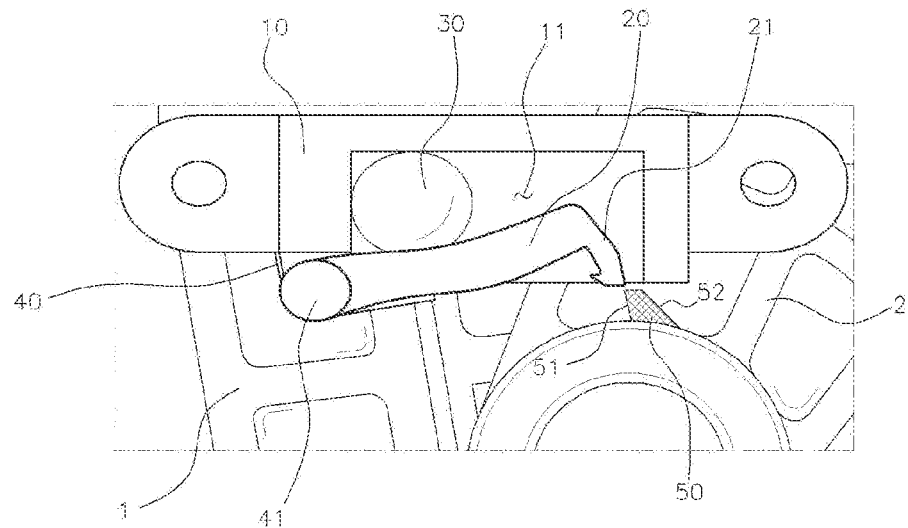
ORDINARY STATE
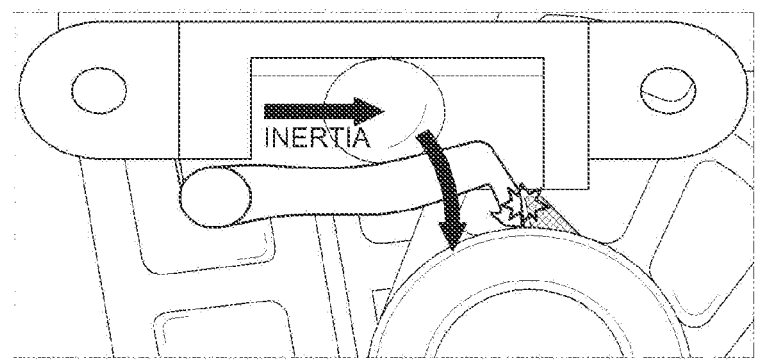
WHEN REAR-END COLLISION OCCURS
FIG. 3B

# STRUCTURE FOR PREVENTING GEAR SHIFT LEVER FROM MOVING WHEN REAR-END COLLISION OCCURS

CROSS-REFERENCE TO RELATED APPLICATIONS

The present application claims priority of Korean Patent Application Number 10-2013-0060073 filed May 28, 2013, the entire contents of which application is incorporated herein for all purposes by this reference.

BACKGROUND OF INVENTION

1. Field of Invention

The present invention relates to a structure for preventing a gear shift lever from moving when a rear-end collision of a vehicle occurs, and more particularly, to a gear shift lever movement preventing structure which has a lever that is lowered downward by a ball that slides by inertia, and a protruding portion that is mounted on a vehicle body or a peripheral component (more particularly, an engaging lever) of a gear shift lever so as to block movement of the lever.

2. Description of Related Art

A gear shift lever of a vehicle mounted with an automatic transmission is mounted on the right side (on the left side, in accordance with a vehicle type) of a driver seat in the vehicle body, and configured to be sequentially movable between positions of respective stages of P (Park), R (Reverse), N (Neutral), and D (Drive).

The gear shift lever having a general structure has a locking structure in order to prevent an erroneous operation of a driver. That is, a switch is attached on an upper end of the gear shift lever, and a detent pin mounted on a lower end of the gear shift lever is raised or lowered in accordance with an operation of pushing the switch.

The detent pin slides along an inner circumferential surface of a hole formed in a detent plate, and a jaw is optionally formed at a position corresponding to each of the stages of P, R, N, and D in order to block sliding of the detent pin.

Therefore, the gear shift lever may be moved at a position where the jaw is formed, only in a state in which the detent pin is lowered by an operation of pushing the switch (or only in a state in which the detent pin is raised in accordance with a shape of the detent plate).

In a general automatic transmission structure, for operational convenience of a driver, when the gear shift lever is moved from a D-stage or an N-stage to an R-stage, the gear shift lever may be moved only in a state in which the switch is pushed (because the jaw is formed), but when the gear shift lever is moved from the R-stage to the D-stage or the N-stage, for a quick operation, the gear shift lever may be moved without pushing the switch.

However, in the aforementioned structure of the related art, when the vehicle collides with any object while traveling rearward or at the time of a rear-end collision in a state in which the gear shift lever is placed at the R-stage, the gear shift lever is likely to be moved from the R-stage to the D-stage by inertia, and this unintentional movement of the gear shift lever is likely to result in a secondary accident.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a structure for preventing a gear shift lever from moving, which may forcibly block a sliding of the gear shift lever placed at an R-stage when a rear-end collision of a vehicle occurs.

Various aspects of the present invention provide for a structure for preventing a gear shift lever from moving when a rear-end collision occurs, including: a case having one side end mounted on the gear shift lever, and a sliding groove formed in the case so that a bottom side of the sliding groove is opened along a longitudinal direction of the case; a lever having one side end coupled to the case through a shaft so as to be rotatable below the sliding groove; a ball seated on the sliding groove on the lever; a spring coupled to the lever so that elastic force is applied in a direction in which the lever is raised up;

a protruding portion mounted on a peripheral component of the gear shift lever or a vehicle body so as to be separated from the gear shift lever and positioned below the other side end of the lever, in which when the lever is rotated downward in accordance with a sliding position of the ball, an end of the lever is locked by the protruding portion such that movement of the gear shift lever is blocked.

A latch portion, which is bent downward, may be formed on the end of the lever, and the latch portion may come into contact with the protruding portion when the lever is rotated.

One side surface of the protruding portion of the present invention may be formed to be a vertical surface so as to block movement of the lever when the latch portion meets the one side surface, and the other side surface of the protruding portion may be formed to be an inclined surface so as to allow the lever to be rotatable upward when the latch portion meets the other side surface.

A gliding groove may be formed in an upper surface of the lever according to the present invention along a longitudinal direction of the lever.

The protruding portion may be mounted on an engaging lever that is coupled to and operated together with the gear shift lever, and the engaging lever has a structure in which movement of the engaging lever is stopped when the gear shift lever placed at an R-stage is moved to an N-stage at a predetermined speed or higher in accordance with a rear-end collision.

According to the present invention configured as described above, when a rear-end collision of a vehicle occurs, the ball slides due to inertia so as for the lever to be rotated downward such that movement of the lever is physically blocked by the protruding portion, thereby preventing a secondary accident by preventing the gear shift lever placed at an R-stage from unintentionally moving.

Since the latch portion, which is bent downward, is formed on one side end of the lever of the present invention, a thickness of the lever and/or a size of the ball may be reduced. Since the protruding portion has the inclined surface positioned at an opposite side related to a side facing the lever, even though the ball slides by inertia when the gear shift lever is quickly moved from the D-stage to the R-stage or the P-stage, the latch portion is rotated along the inclined surface such that the gear shift lever may be prevented from being locked.

The lever has the gliding groove in order to prevent the ball from being moved away, thereby reducing frictional force.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 3A and 3B are views illustrating an exemplary aspect in which the gear shift lever movement preventing apparatus, which is mounted as illustrated in FIG. 1A, is in an ordinary state, and an aspect in which the gear shift lever movement preventing apparatus is operated when a rear-end collision occurs.

DETAILED DESCRIPTION

Figures 1A, 1B:
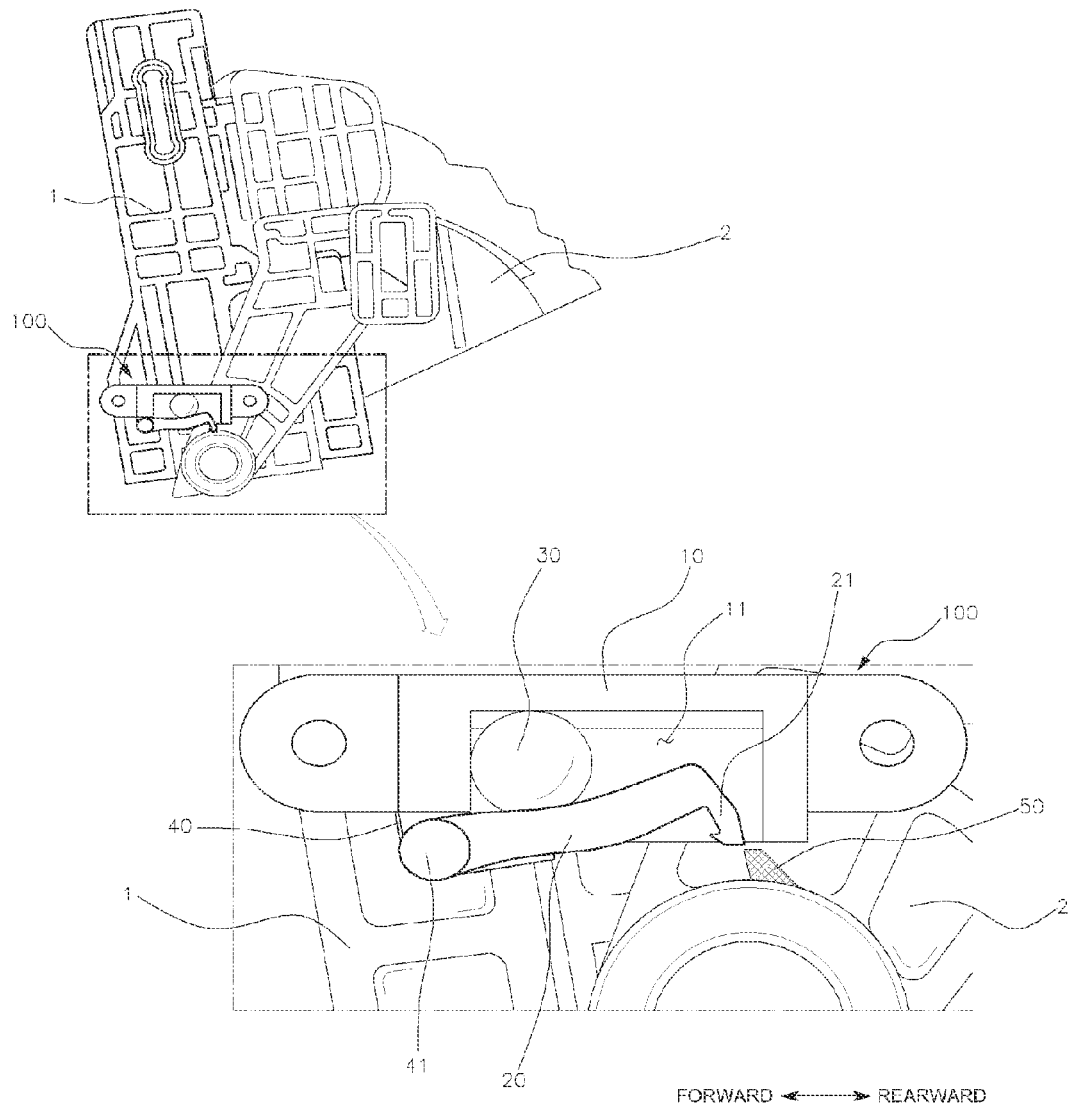
FIGS. 1A and 1B are views illustrating an exemplary aspect in which a gear shift lever movement preventing apparatus according to the present invention is mounted on a gear shift lever and an engaging lever.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1A to 3B, a gear shift lever movement preventing apparatus 100 according to various embodiments of the present invention is mounted on a gear shift lever 1. A protruding portion 50, which configures a part of the gear shift lever movement preventing apparatus 100, may be attached on a peripheral fixed component of the gear shift lever 1 or a fixed position of a vehicle body. In the present invention, the protruding portion 50 is mounted on an engaging lever 2 that is a device, which is mounted together with sensors and electric devices so as to detect a position of the gear shift lever, and coupled to the gear shift lever so as to be rotated and operated together with the gear shift lever.

The engaging lever 2 of the present invention has a structure in which a rotation of the engaging lever 2 is stopped when the gear shift lever placed at an R-stage is moved to an N-state at a predetermined speed or higher due to a rear-end collision. Various aspects of the engaging lever, which is typically coupled together with the gear shift lever when the gear shift lever is mounted, are similar to those described in more detail in Korean Patent Application Nos. 10-2011-0075855, 10-2011-0075854, and 10-2006-0077876.

The gear shift lever movement preventing apparatus 100 of the present invention except for the protruding portion 50 is mounted on the gear shift lever 1 in a state in which a case 10, a lever 20, a ball 30, and a spring 40 are coupled to each other.

Figure 2:
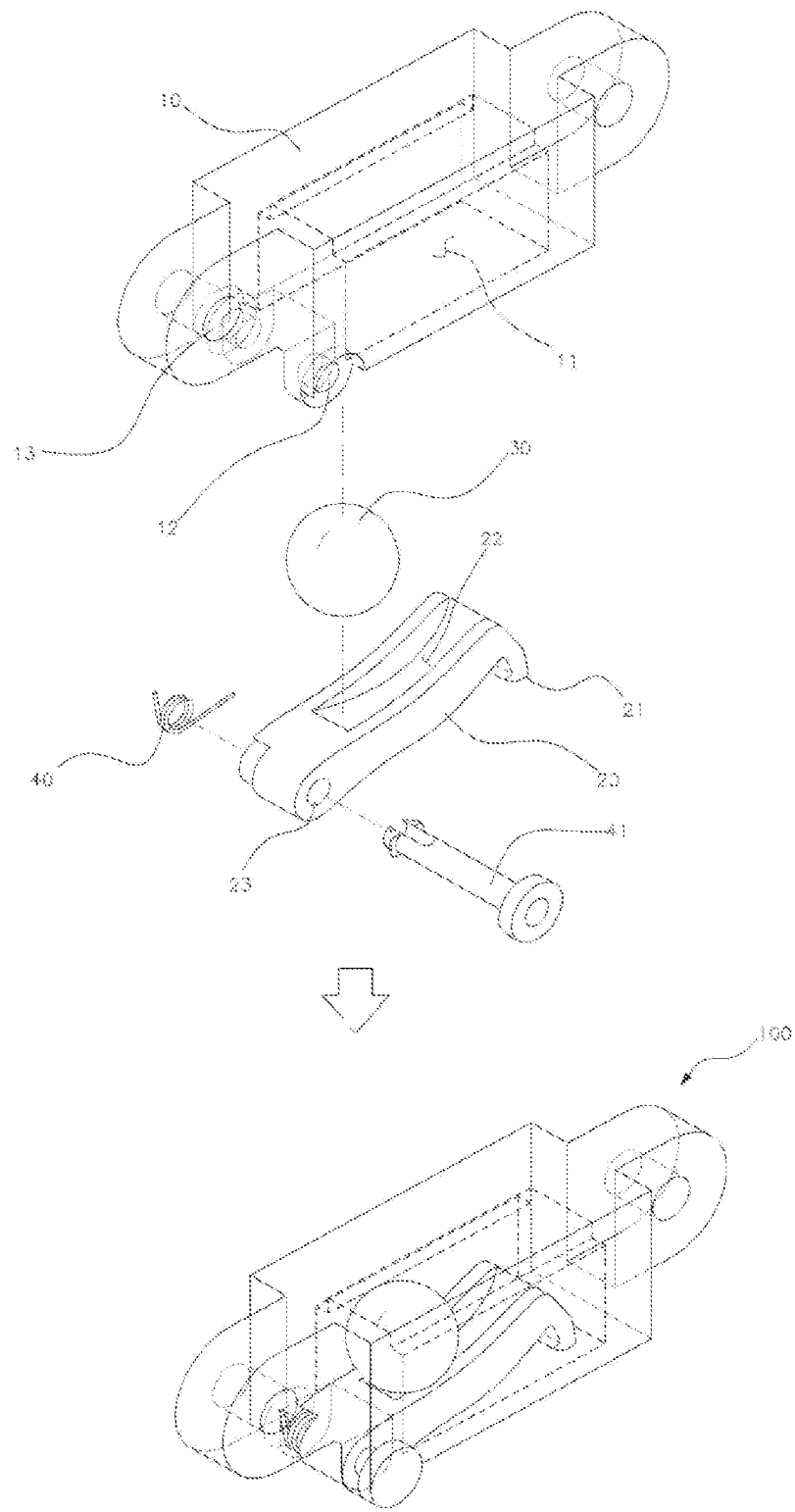
FIG. 2 is a view illustrating an exploded perspective view and a perspective view of the gear shift lever movement preventing apparatus which is mounted as illustrated in FIG. 1A.

As illustrated in FIG. 2, the case 10 of the present invention has a hole 13 that allows the case 10 to be mounted on the gear shift lever 1 by means of bolting engagement, and a hole 12 into which a shaft 41 is fitted, and has a structure in which a sliding groove 11 is formed in the case 10 so that a bottom side of the sliding groove 11 is opened along a longitudinal direction of the case 10.

Below the sliding groove 11, one side end of the lever 20 is coupled to the case 10 to be rotatable about the shaft 41 that is a rotating axis. A gliding groove 22 is formed in an upper surface of the lever 20 along a longitudinal direction of the lever 20, and the ball 30 is seated on the gliding groove 22. The spring 40, which resists against torsion force, is fitted with the shaft 41 so that elastic force is applied in a direction in which an end (an end on which a latch portion is formed) of the lever 20 is raised up.

Therefore, the lever 20 is rotated downward by a weight of the ball 30 in accordance with a sliding position of the ball 30, and the end of the lever 20 is locked by the protruding portion 50 such that movement of the gear shift lever 1 is blocked.

FIG. 3 illustrates an aspect of the gear shift lever movement preventing apparatus 100 when the gear shift lever 1 is placed at the R-stage. Referring to FIG. 3, in an ordinary state in which large inertia is not instantaneously applied to the ball 30, since the lever 20 is moved above the protruding portion 50 because of elasticity of the spring 40, an operation of the gear shift lever by a driver is not affected by the lever 20.

However, when a rear-end collision of a vehicle occurs and the lever 20 is rotated downward as inertial force is applied to the ball 30, the lever 20 is locked by the protruding portion 50 such that the movement of the gear shift lever 1 is prevented.

Meanwhile, in various embodiments of the present invention, a latch portion 21, which is bent downward, is formed on the end of the lever 20, and the latch portion 21 is configured to come into contact with the protruding portion 50 when the lever 20 is rotated. Further, a front side of the protruding portion 50 of the present invention is formed to be a vertical surface 51 (see FIG. 3) so as to block the movement of the lever when the latch portion 21 meets the front side of the protruding portion 50, and a rear side of the protruding portion 50 is formed to be an inclined surface 52 so as to allow the lever 20 to be rotatable upward when the latch portion 21 meets the rear side of the protruding portion 50.

According to the aforementioned configuration, since the protruding portion 50 has the inclined surface 52, even though inertia is applied to the ball 30 when the gear shift lever 1 is rapidly moved from a D-stage to the R-stage or a P-stage, the latch portion 21 is rotated along the inclined surface 52 such that the gear shift lever 1 may be prevented from being locked, and the ball 30 may be quickly returned back to an original position.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for preventing a gear shift lever from moving during a rear-end collision, the structure comprising:
   a case mounted on the gear shift lever and including a sliding groove, wherein a bottom side of the sliding groove opens along a longitudinal direction of the case;
   a lever including one end pivotally coupled to the case and another free end spaced from the one end, the lever being rotatable within and below the sliding groove;
   a ball supported on the lever;
   a spring coupled to the lever so that elastic force biases the lever into the sliding groove; and
   a protruding portion configured to rotate with the gear shift lever, the protruding portion being mounted separate from the gear shift lever and positioned below the free end of the lever;
   wherein the ball is configured to move toward the free end of the lever during a rear-end collision to rotate the lever downward and lock the free end of the lever against the protruding portion to block movement of the gear shift lever.

2. The structure of claim 1, wherein a latch portion, which is bent downward, is formed on the free end of the lever such that the latch portion comes into contact with the protruding portion when the lever is rotated.

3. The structure of claim 2, wherein one side surface of the protruding portion is formed to be a vertical surface so as to block movement of the lever when the latch portion meets the one side surface, and another side surface of the protruding portion is formed to be an inclined surface so as to allow the lever to be rotatable upward when the latch portion meets the another side surface.

4. The structure of claim 3, wherein the protruding portion is mounted on an engaging lever that is coupled to and operated together with the gear shift lever, and the engaging lever has a structure in which movement of the engaging lever is stopped when the gear shift lever placed at an R-stage is moved to an N-stage at a predetermined speed or higher.

5. The structure of claim 1, wherein a gliding groove is formed along an upper surface of the lever along a longitudinal direction of the lever.

6. The structure of claim 2, wherein a gliding groove is formed along an upper surface of the lever along a longitudinal direction of the lever.

7. The structure of claim 3, wherein a gliding groove is formed along an upper surface of the lever along a longitudinal direction of the lever.

* * * * *